United States Patent [19]

Morrison

[11] 4,047,939
[45] Sept. 13, 1977

[54] SLIMES TREATMENT PROCESS

[75] Inventor: Bernard H. Morrison, Mississauga, Canada

[73] Assignee: Noranda Mines Limited, Toronto, Canada

[21] Appl. No.: 586,819

[22] Filed: June 13, 1975

[51] Int. Cl.² .............................................. C22B 11/00
[52] U.S. Cl. .......................................... 75/99; 75/83; 75/109; 75/118 R; 423/509
[58] Field of Search .................... 75/99, 117, 109, 121, 75/83; 423/509

[56] References Cited

U.S. PATENT DOCUMENTS

| | | | |
|---|---|---|---|
| 2,039,256 | 4/1936 | Martin | 75/99 |
| 3,627,486 | 12/1971 | Nakano | 423/509 |

Primary Examiner—G. Ozaki
Attorney, Agent, or Firm—Finnegan, Henderson, Farabow & Garrett

[57] ABSTRACT

Slimes from electrolytic copper refinery are first treated by leaching them with dilute sulphuric acid under an oxygen partial pressure of up to 50 psi and an elevated temperature, until copper and tellurium present in the slimes are substantially dissolved, and effecting a liquid-solid separation of the leached slurry so produced to separate the leach liquor from the leach slimes. The leach liquor is then treated with metallic copper to cement the tellurium as copper telluride. The latter is separated from the remaining solution which is suitable for the production of copper sulphate. The leach slimes containing mainly selenium, lead, silver, gold and other impurities are dried, mixed with a binder and pelletized and the pellets are then roasted to remove selenium as selenium dioxide. Finally, the roasted pellets are smelted to remove the remaining impurities leaving a dore metal containing essentially silver and gold.

11 Claims, 1 Drawing Figure

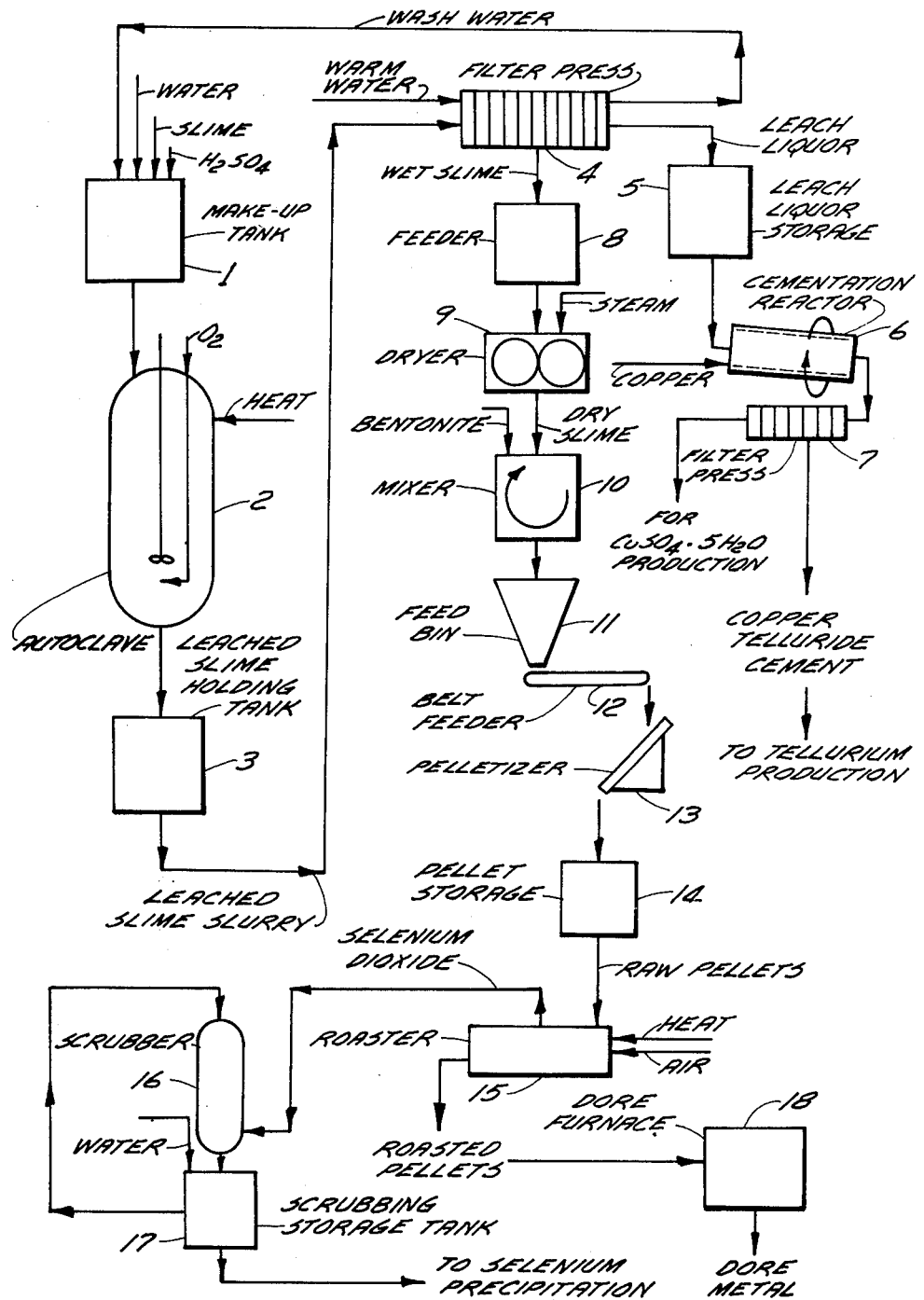

SLIMES TREATMENT PROCESS

This invention relates to the treatment of slimes from the electroytic refining of copper.

It is already known to digest slimes from copper electrolysis using concentrated sulphuric acid and air at atmospheric pressure. The digested slimes may then be roasted to drive off the selenium as volatile selenium dioxide or may be treated with diluted acids or alkli to dissolve oxidized copper, selenium and tellurium which must then be separated. The main disadvantages of this method include a substantial emmission of $SO_2$ during the digesting operation as well as the length of time of such digesting operation which lasts usually between 4 and 6 hours. There are also difficulties involved in obtaining proper separation of copper, selenium and tellurium from one another.

It has also been recently suggested in German Pat. No. 1,948,300 of Norddeutsche Affinerie to treat slimes in an autoclave at a pressure of over 5 atmospheres and a temperature above the boiling point of the solution present in the autoclave in order to remove copper and nickel from the solution while leaving selenium tellurium, arsenic and the noble metals in the solid residue. This method has the disadvantage of operating at very high pressure, leading to engineering difficulties and excessive capital and maintenance costs for autoclaves, and also leaves the problem of separating various substances in the residue, such as selenium and tellurium, from one another.

It is accordingly the object of the present invention to devise an improved method which provides the treatment of copper refinery slimes in a simple and efficient operation leading to ready separation of the various constituents of the slimes.

It is a further ojbect of the invention to provide enconomical method for treating copper refinery slimes employing readily available equipment or equipment which may be easily manufactured, using pressures below 5 atmospheres.

Other objects and advantages of the novel slimes treatment process will be apparent from the further more detailed description thereof.

The method of this invention basically comprises leaching the slimes with dilute sulphuric acid under an oxygen partial pressure of up to about 50 psi, preferably between about 20 and 50 psi, and an elevated temperature of between about 180° and 320° F (85° and 160° C), preferably between about 200° and 300° F, until copper and tellurium present in the slimes are substantially dissolved, and effecting a liquid-solid separation of the leached slurry so as to separate the leach liquor from the leach slimes, then the leach liquor is treated with metallic copper to cement the tellurium as copper telluride and said copper telluride cement is separated from the remaining solution which is suitable for the production of copper sulphate, whereas the leached slimes containing mainly selenium, lead, silver, gold and remaining impurities are dried, mixed with a binder and pelletized, the pellets are then roasted to remove selenium dioxide and the roasted pellets are smelted to remove the remaining impurities leaving a doré metal containing essentially silver and gold.

The leaching takes place in an autoclave under normal agitation using diluted sulphuric acid preferably having a sulphuric acid concentration of between about 20 and 40%. The most preferred acid concentration has been found to be between 250 gpl and 300 gpl. Within two or three hours, depending on the ultimate leaching conditions, the leaching operation will normally lead to the dissolution of substantially all copper and of at least 75% of tellurium. The leach liquor containing these metals is then filtered from the leach slimes which are then usually washed with warm water. This leach liquor is then treated with metallic copper preferably in the form of copper shot or the like to cement the tellurium as copper telluride which can then be treated in a conventional manner to obtain pure tellurium or its desired compounds. The remaining solution is suitable for the production of copper sulfate ($CuSO_4.5H_2O$) also in conventional manner.

The treatment of the leach liquor with metallic copper can be performed in any conventional manner but it is preferred to carry it out in a cementation reactor which has a form of generally horizontally disposed cylindrical vessel with inwardly projecting baffles provided along its internal wall to achieve adequate intermixing of the copper shot with the leach liquor. The reactor is rotatable about its horizontal axis and is normally slightly inclined towards its feeding end. In operation it is provided with copper shot or similar metallic copper material in sufficient amount to cement the tellurium of the leach liquor which is introduced into the reactor so that it is about half to three quarters full. The reactor is then rotated while maintaining the temperature of the material in the range of 150° to 200° F, thereby providing good intermixing of the copper shot with the liquor contained in the reactor. This leads to effective cementation of the tellurium present in the reactor to copper telluride within a period of about one to two hours. Obviously the dimensions of such cementation reactor can vary depending on the quantities of liquor to be treated. The amounts of copper shot necessary as well as of liquor to be introduced into the reactor will be readily determined by a man familiar with the art depending on the quantity of tellurium present in the liquor which is to be cemented as copper telluride. The specific temperature and time of operation can also be readily adjusted to achieve optimum results.

The leached slimes from the leaching operation are normally unsuitable for pelletization as such because they are too wet and the amount of moisture in the slimes is a very important factor to achieve proper pelletization. The slimes also cannot be roasted directly to remove selenium dioxide because they are not in the form which is most suitable for such operation. The oxidizing medium, such as air, will not readily pass through unpelletized slimes during roasting and they will agglomerate into large roasted chunks which would be difficult to treat further and from which the recovery of selenium is poor.

It is already known from U.S. Pat. No. 2,948,591 to roast slimes admixed with a binder and pelletized into suitable pellets or other similar agglomerates in order to separate oxidized selenium therefrom. Such an operation is quite advantageous and for this reason the wet slimes coming from the leaching operation according to this invention must be adapted for pelletization and then roasting of the obtained pellets. This has been achieved by drying the wet leached slimes then admixing them with a binder such as bentonite and pelletizing the same into suitable pellets having a diameter of between about ¼ and about ¾ inch.

The drying operation is preferably carried out in one step by passing the wet slimes between a pair of heated rolls which dry and pulverize the slimes.

The rolls are preferably heated with steam which is injected inside of said rolls. When the wet slimes are introduced between these rolls they are heated and squeezed, thereby reducing their moisture content from about 25% to about 8% or less. It should also be noted that the rolls of the drier are preferably chromium plated in order to prevent sticking of the leached slimes thereonto.

Once the wet slimes have been so dried, they are admixed with bentonite or another suitable binder to provide a consistency suitable for pelletization and the mixture is then pelletized into pellets of desired size. Preferably a disc pelletizer is used onto which this mixture is fed together with some water to produce the desired pellets. Thereafter these pellets are roasted at a temperature of between about 1,200° F and 1,500° F for a period of one to two hours, preferably with an air flow of about 30 to 60 cfm to remove selenium dioxide, which can then be scrubbed with water to produce selenious acid. Selenious acid may then be transformed in conventional manner into elemental selenium by precipitation with sulphur dioxide.

Finally, the roasted pellets are smelted in a doré furnace in conventional manner to remove the remaining impurities leaving a doré metal containing about 96% silver and about 4% gold. The smelting operation in the doré furnace takes place at a temperature in the range of 1,800° F to 2,500° F with addition of soda ash as flux. This, of course, is well known in the art.

The above method has been found to be most advantageous for treating copper refinery slimes. It should be noted that it is the combination of the various treatments or steps, in accordance with the present invention, into a single and efficient method for selective separation of the various components of copper slimes which is believed to be novel and unobvious.

The invention will now further be described in greater detail with reference to the appended drawing which diagrammatically illustrates a preferred embodiment of the method according to the present invention.

As shown in the drawing, the slimes from a copper refinery are mixed with predetermined quantities of water and $H_2SO_4$ in a make-up tank 1 from which the mixture is introduced into autoclave 2 where the leaching operation is performed under oxygen pressure, heat and agitation. Oxygen cannot be replaced by air because if air under pressure is used, a great deal of foam will be formed and the leaching operation will not proceed successfully. Once the leaching operation is terminated, the leached slime slurry is transferred into a holding tank 3 from which it is introduced into a filter press 4. After initial liquid-solid separation in the filter press 4, warm water is introduced into this filter press to wash the solids. This warm water may then be returned into make-up tank 1 replacing fresh water, for the preparation of a new batch.

The leached liquor from the filter press 4 is forwarded to a leach liquor storage tank 5 from which it is introduced into a cementation reactor 6 together with metallic copper, to effect cementation of tellurium as copper telluride. The copper telluride cement is then separated from the remaining solution by filter press 7 and sent for further convention treatment of produce pure tellurium while the solution is sent to a copper sulphate plant for production of $CuSO_4.5H_2O$.

The wet slimes from filter press 4 are forwarded through a feeder 8 to a steam roller drier 9. The wet slimes are introduced into the nip of a pair of steel rollers and are dried and pulverized through heat and pressure between said rollers. To avoid sticking of the slimes to the rollers the latter are preferably chromium plated. Then, the dried slimes are admixed with a binder, such as bentonite, in mixer 10, and fed through a feed-bin 11 and belt feeder 12 onto a pelletizer 13 where they are pelletized into pellets of suitable size of between about ¼ and ⅜ inch in diameter. The binder is preferably used in a proportion of between 5 and 10%. The obtained raw pellets are introduced into a storage tank 14 from which they are conveyed into a roaster 15 where they are roasted using heat and air to form selenium dioxide which can then be scrubbed in scrubber 16 with water to form selenious acid that can be stored in the storage tank 17 from which it will be forwarded to selenium precipitation.

The roasted pellets coming out of roaster 15 are smelted in a doré furnace 18 to remove remaining impurities and to produce the doré metal consisting essentially of silver and gold.

The following non-limitative example will further illustrate the invention:

EXAMPLE 4,700 lbs of slimes, on dry basis, from the copper refinery of Canadian Copper Refiners Limited, in Montreal East, Canada, having approximately the following composition:

| | |
|---|---|
| Cu | 21–26% |
| Ag | 20–27% |
| Au | 0.30–0.45% |
| Se | 12–15% |
| Te | 1.5–2.2% |
| Pb | 5–10% |
| $SO_4$ | 10–14% |
| As | 1.5–2.0% |
| Sb | 1–1.5% |
| Bi | ~0.5% |
| $SiO_2$ | ~4.0% |
| Sn | ~0.5% |
| Zn | ~0.3% | were introduced into a make-up tank together with 1,550 gal. of water and 280 gal. of 93% $H_2SO_4$ and mixed therein to obtain a slurry having a specific gravity of about 1.3. The slurry was then charged into a stainless steel baffled autoclave having a capacity of 2,400 gallons and provided with a 6 blade 25 HP turbine capable of running at 175 rpm. The autoclave was heated through an outer stem jacket until the temperature of the slurry therein reached 240° F.

An outer cooling jacket, which alternated with the steam jacket, was also provided to maintain the temperature at the desired level. The autoclave was pressurized with oxygen to a total pressure of 50 psig with the oxygen partial pressure being about 30 psi. 5,700 cubic feet of oxygen were used during the leaching operation which lasted three hours and the leached slime slurry was then discharged into a holding tank.

The slurry was then filtered to separate the leach liquor from the solid slimes which were further washed with warm water. The filter press used for this operation was of a plate and frame type having a filtering volume of 30 cubic feet.

About 1,600 gallons of leached liquor were produced having 85 gpl Cu, 60 gpl Te and 150 gpl $H_2SO_4$. Also, about 4,300 lbs of wet leached slime with a moisture content of about 25% were produced having 1% Cu, 1% Te, 19% Se, as well as lead, silver, gold and the remaining impurities.

The leached liquor was then treated in a horizontal cylindrical reactor (27 ft. long × 2½ ft. diameter) having inwardly projecting radial baffles provided along its internal wall, said reactor rotating at 15 rpm and being loaded with 7.500 lbs of copper shot. The feed rate of solution to the reactor was 10 gallons per minute and the temperature was 200° F. The reactor was made of 316 stainless steel. the cementation slurry was then filter-pressed giving about 140 lbs of copper telluride and about 1,600 gallons of leach liquor for copper sulphate production. The leach liquor contained about 90 gpl Cu, 1 gpl Te and about 110 gpl $H_2SO_4$. At least 85% Te was removed during this operation. The filter pass used was identical to the leached slime filter press already described above.

The wet slim from the leach slime filter press containing about 25% mositure was dried by passage through a chromium plated stainless steel roller drier heated with steam. The moisture content of dry slime was about 8%. The dry slime was the mixed with bentonite in a proportion of 100 lbs of bentonite for 1,500 lbs of slime and the mixture was charged onto a 54 inch diameter disc pelletizer capable of producing 1,500 lbs of raw pellets per hour. A little water in the form of water jets was also directed onto the pelletizer to help produce the desired pellets. The preferred pellet diameter was found to be ⅜ of an inch.

The obtained raw pellets were then roasted in a roaster, which can be of continuous or batch type, having an operating temperature of about 1,500° F. Air flow through the pellets was about 30 cfm. An adequate flue system for removing about 300 lbs of $SeO_2$ per hour was also provided.

The selenium dioxide from the roaster was treated in a scrubber system which is capable of scrubbing 300 lbs of $SeO_2$ per hour using water. Water (as selenius acid: $H_2SeO_3$) was recirculated to produce $H_2SeO_3$ solution containing about 100 gpl Se, which is suitable for selenium precipitation. 1,500 lbs per hour of raw pellets were normally introduced into the roaster containing about 19% Se and resulting in about 300 lbs per hour of $SeO_2$ which were sent to scrubbers and about 1,215 lbs per hour of roasted pellets which were transferred to a dore furnace for smelting and production of the doré metal.

In the doré furnace, the roasted pellets were smelted with soda ash at temperatures between 1,800° F and 2,500° F to remove remaining impurities leaving a doré metal containing about 96% silver and 4% gold. This foré metal was finally treated in a parting plant to separate silver from gold.

What is claimed is:

1. A method of treating slimes from the electrolytic refining of copper comprising:
   a. leaching said slimes with dilute sulphuric acid under an oxygen partial pressure of up to 50 psi and at an elevated temperature between about 180° and 320° F until copper and tellurium in said slimes are substantially dissolved, thereby forming a leach slurry;
   b. effecting a liquid-solid separation on said leach slurry to separate leach liquor from the solid leach slimes;
   c. treating said leach liquor with metallic copper to cement the tellurium as copper telluride and form a remaining solution suitable for the production of copper sulphate; and
   d. separating the cemented copper telluride solids from said solution.

2. Method according to claim 1, wherein the oxygen partial pressure used during leaching of the slimes is between 20 and 50 psi.

3. Method according to claim 1, wherein the temperature used during the leaching of the slimes is between about 200° and 300° F.

4. Method according to claim 1, wherein the initial concentration of the sulphuric acid used for the leaching is between about 250 gpl and 300 gpl.

5. Method as claimed in claim 1, in which the liquid-solid if the leach slurry is effected by means of a filter press and the solids are further washed with warm water.

6. Method as claimed in claim 1, wherein the leach liquor resulting from the liquid-solid separation is treated with metallic copper in the form of fine copper shot in a rotating cylindrical horizontally disposed cementation reactor provided with internal baffles to achieve suitable intermixing of the copper shot with the leached liquor during treatment, said reactor being sligthly inclined toward its feed end.

7. Method according to claim 6, in which the cementation operation is carried out at a temperature of between 150° and 200° F.

8. The method of claim 1 wherein said leach slimes containing selenium, gold, silver and other impurities and are treated by:
   a. drying said leach slimes;
   b. mixing said leach slimes with a binder;
   c. pelletizing said binder containing leach slimes;
   d. roasting said pellets to remove selenium therefrom; and
   e. smelting said roasted pellets to remove remaining impurities to form dore metal, containing essentially silver and gold.

9. Method according to claim 8 wherein the leached wet slimes containing about 25% moisture are dried by means of a steam heated roller drierhaving two chromium plated stainless steel rollers positioned face to face so that the wet slimes being fed into the nip of said rollers are pressed thereby to produce substantially dry material suitable for pelletization.

10. Method according to claim 8, wherein the binder is bentonite and it is added in a proportion of between about 5 and 10%.

11. Method according to claim 8, wherein the pellets are roasted at a temperature of between 1,200°–1,500° F with an air flow of 30 to 60 cfm during a period of 1 to 2 hours.

* * * * *